(12) United States Patent
Griffith et al.

(10) Patent No.: US 9,761,941 B2
(45) Date of Patent: Sep. 12, 2017

(54) DIRECTIONAL MULTIBAND ANTENNA

(71) Applicant: BAE SYSTEMS plc, London (GB)

(72) Inventors: Michael Stewart Griffith, Chelmsford (GB); Leslie Charles Laycock, Chelmsford (GB)

(73) Assignee: BAE SYSTEMS plc, London (GB)

( * ) Notice: Subject to any disclaimer, the term of this patent is extended or adjusted under 35 U.S.C. 154(b) by 82 days.

(21) Appl. No.: 14/762,678

(22) PCT Filed: Jan. 27, 2014

(86) PCT No.: PCT/GB2014/050206
§ 371 (c)(1),
(2) Date: Jul. 22, 2015

(87) PCT Pub. No.: WO2014/114954
PCT Pub. Date: Jul. 31, 2014

(65) Prior Publication Data
US 2015/0357712 A1    Dec. 10, 2015

(30) Foreign Application Priority Data

Jan. 28, 2013  (EP) .................................... 13275018
Jan. 28, 2013  (GB) .................................. 1301420.4

(51) Int. Cl.
*H04B 10/00*  (2013.01)
*H01Q 5/22*  (2015.01)
(Continued)

(52) U.S. Cl.
CPC ................. *H01Q 5/22* (2015.01); *H01Q 1/24* (2013.01); *H01Q 15/08* (2013.01); *H01Q 19/06* (2013.01); *H01Q 19/062* (2013.01); *H04B 10/43* (2013.01)

(58) Field of Classification Search
CPC ........ H01Q 5/22; H01Q 19/06; H01Q 19/062; H04B 10/43
(Continued)

(56) References Cited

U.S. PATENT DOCUMENTS 4,791,427 A    12/1988   Raber et al.
5,327,149 A     7/1994   Kuffer
(Continued)

FOREIGN PATENT DOCUMENTS

DE    3505583 A1    10/1985
GB    2215454 A      9/1989
(Continued)

OTHER PUBLICATIONS

International Preliminary Report on Patentability and Written Opinion received for Patent Application No. PCT/GB2014/050206, mail date Aug. 6, 2015. 8 pages.
(Continued)

*Primary Examiner* — Don N Vo
(74) *Attorney, Agent, or Firm* — Finch & Maloney PLLC

(57) ABSTRACT

There is disclosed A directional multi-band antenna, the antenna comprising: —an optical unit comprising an optical sensor; —an RF unit comprising an RF sensor; —a substantially planar optical lens, the optical lens comprising surface relief elements for beam forming, the lens being arranged to focus optical signal beams, incident along a first optical axis, onto the optical sensor, the optical lens being substantially transparent to RF signals, —an RF beam forming device arranged to receive RF signals incident along the first optical axis and focus such RF signals onto the RF sensor.

20 Claims, 5 Drawing Sheets

Figure 1:
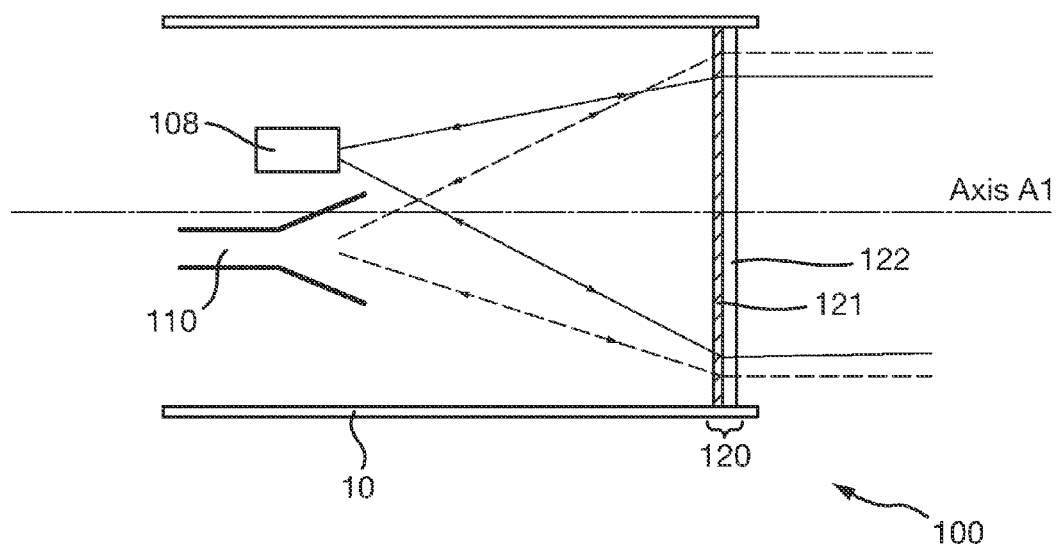

(51) Int. Cl.
*H01Q 19/06* (2006.01)
*H01Q 1/24* (2006.01)
*H04B 10/43* (2013.01)
*H01Q 15/08* (2006.01)

(58) Field of Classification Search
USPC .......................................................... 398/117
See application file for complete search history.

(56) References Cited

U.S. PATENT DOCUMENTS

| | | | |
|---|---|---|---|
| 5,436,453 A | | 7/1995 | Chang et al. |
| 5,455,589 A | * | 10/1995 | Huguenin ............... G01S 7/032 |
| | | | 342/175 |
| 5,973,649 A | | 10/1999 | Andressen |
| 2006/0132379 A1 | | 6/2006 | Peterson |
| 2009/0079644 A1 | * | 3/2009 | May ...................... H01Q 19/06 |
| | | | 343/753 |
| 2011/0279304 A1 | | 11/2011 | Yonemoto et al. |

FOREIGN PATENT DOCUMENTS

| | | |
|---|---|---|
| WO | 2005045350 A1 | 5/2005 |
| WO | 2007006951 A1 | 1/2007 |
| WO | 2014114954 A1 | 7/2014 |

OTHER PUBLICATIONS

International Search Report and Written Opinion received for Patent Application No. PCT/GB2014/050206, mailed on May 22, 2014. 12 pages.
GB Intellectual Property Office Search Report under Section 17(5) received for GB Patent Application No. 1301420.4 mailed Aug. 22, 2013. 4 pages.
Extended European Search Report received for EP Application No. 13275018.3, dated Jul. 12, 2013. 9 pages.
Black, Donald N. and Wiltse, James C., "Millimeter-Wave Characteristics of Phase-Correcting Fresnel Zone Plates," IEEE Transactions on Microwave Theory and Techniques, vol. MTT-35, No. 12, Dec. 1, 1987. 6 pages.

* cited by examiner

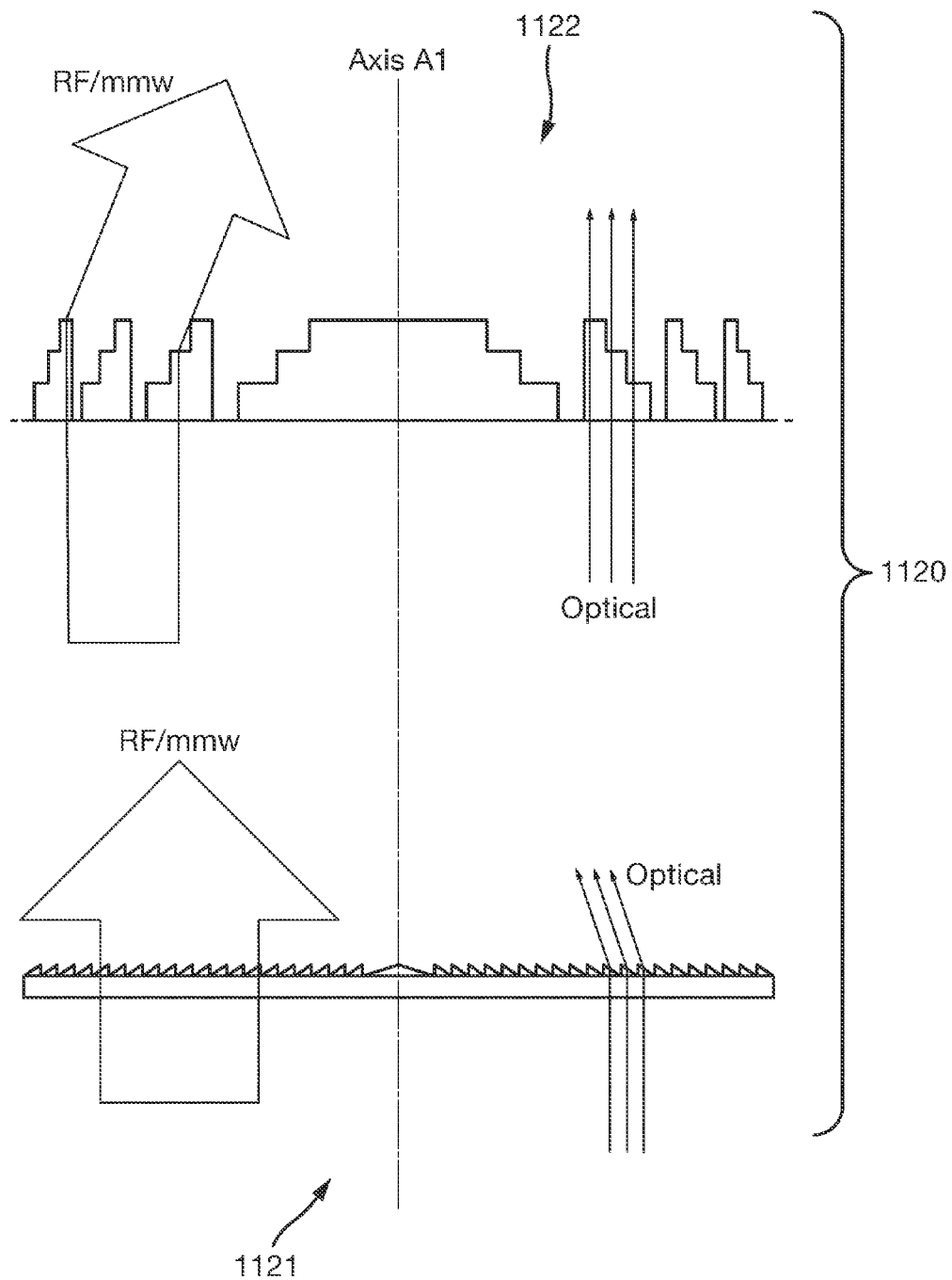

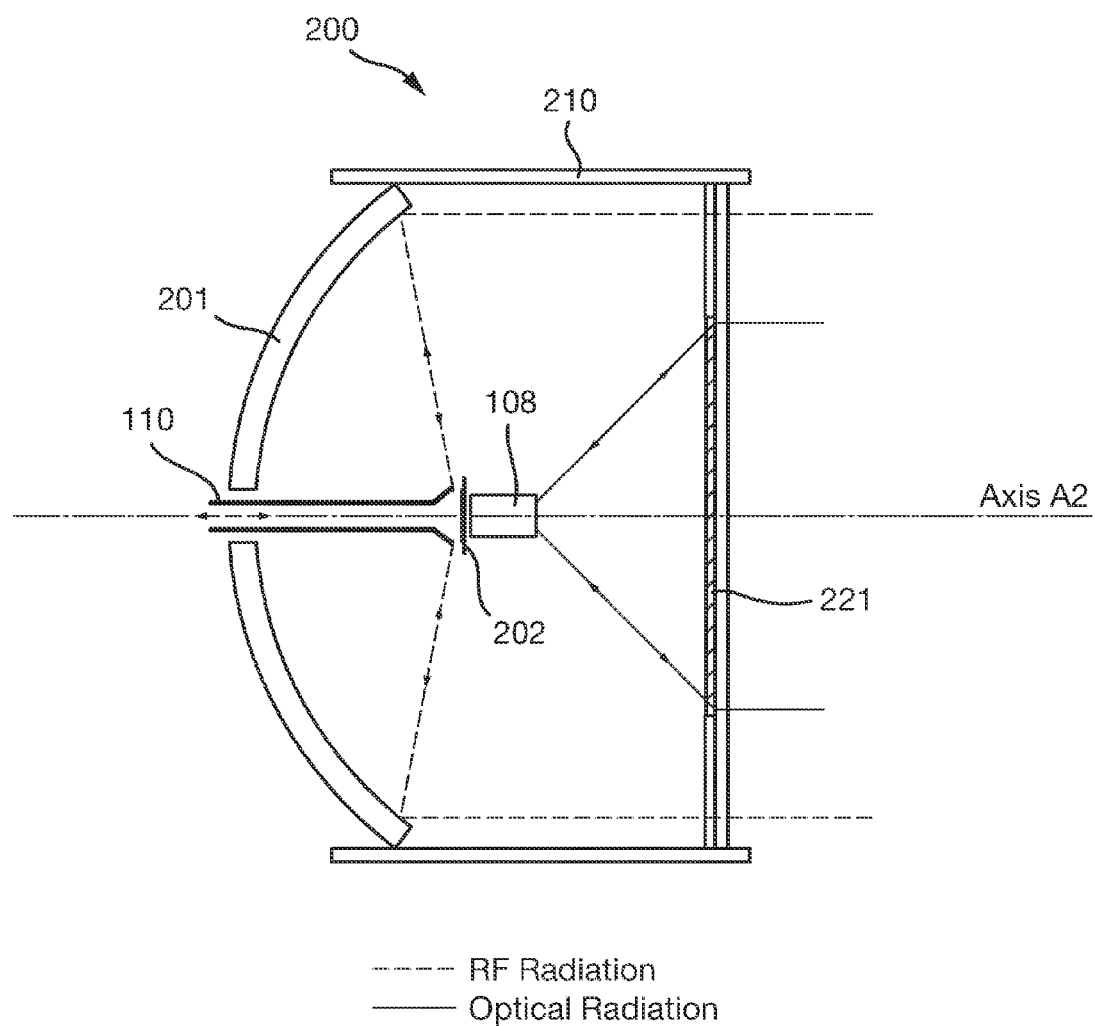

DIRECTIONAL MULTIBAND ANTENNA

The present invention relates to a directional multi-band antenna.

It is known from for example U.S. Pat. No. 8,094,081 to provide a dual-band antenna which may transmit or receive a beam of electromagnetic radiation, at two distinct frequency/wavelength bands, to or from a further source. In U.S. Pat. No. 8,094,081 the first band of electromagnetic radiation is in the visible to near infra-red spectrum (400-1500 nm), and the second band of electromagnetic radiation is in the radio frequency spectrum.

Such a device transmitting or receiving different wavelength/frequency beams along the same bore sight may alternatively be referred to as a 'common aperture' antenna.

According to the present invention there is provided a directional multi-band antenna, the antenna comprising: —an optical unit comprising an optical sensor; —an RF unit comprising an RF sensor; —a substantially planar optical lens, the optical lens comprising surface relief elements for beam forming, the lens being arranged to focus optical signal beams, incident along a first optical axis, onto the optical sensor, the optical lens being substantially transparent to RF signals, —an RF beam forming device arranged to receive RF signals incident along the first optical axis and focus such RF signals onto the RF sensor.

Such an antenna may provide a particularly compact multi-band receiver that may be capable of receiving signals over ranges in the order of 1 km. If there is no visual obstruction in the reception path, the antenna may operate as a Free Space Optical (FSO) communication device; however, should there be optical obstructions, the antenna may switch to perform RF communications. Alternatively the antenna may receive at both RF and optical bands simultaneously.

The optical unit may comprise an optical transmitter unit wherein the substantially planar optical lens is arranged to collimate optical signals emitted by the optical transmitter unit to form a beam parallel to the first optical axis.

By providing a collimated beam, the communications can have improved security and/or be more selective in establishing a link.

The optical unit may be positioned on the first optical axis to transmit and receive optical signals along the first optical axis Alternatively the optical unit may be offset from the optical axis, and wherein the RF unit is offset from the first optical axis.

In general the RF unit and the optical unit will each be arranged so as to be provided with an unobstructed focal region.

The RF beam forming device may be a substantially planar RF lens comprising surface relief elements for beam forming.

The RF beam forming device and the substantially planar optical lens may be integrated such that the surface relief elements of the optical lens are mounted on the surface relief elements of the RF lens.

Such provisions further tend to reduce the size of the device and thus make it more suitable for transportation and/or covert operation.

The substantially planar RF lens may provide an RF focal point for incoming RF signals, which RF focal point is separated from the optical focal point of the incoming Optical signals, and wherein the optical unit is located at the optical focal point and the RF unit is located at the RF focal point, such that neither unit obstructs the focal field associated with the other unit.

The antenna may be further provided with RF reflectors.

Where cost is an issue RF reflectors may be cheaper to provide as compared with other beam forming components. Alternatively the RF beam forming device may comprise RF reflectors and planar RF lenses with surface relief elements.

The optical unit may comprise at least one first sub-unit for transmitting optical signals and at least one second sub unit for receiving optical signals, the first and second sub units being separated.

The RF unit may be operable at a centre-frequency in the range between 50 GHz and 70 GHz.

Such a frequency range can provide highly localised and secure free space line of sight communications links as such frequencies are readily absorbed by the atmosphere.

The RF unit may comprise a transmitter, arranged in relation to the RF beam forming device such that the antenna is able to send substantially collimated RF signals.

The antenna may be directional insofar as it provides a beam collimated in one dimension only, so as to be able to perform a linear scan operation.

Figure 2A:
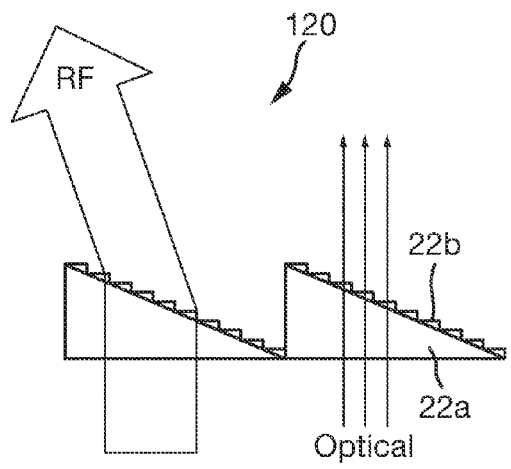
Figure 2B:
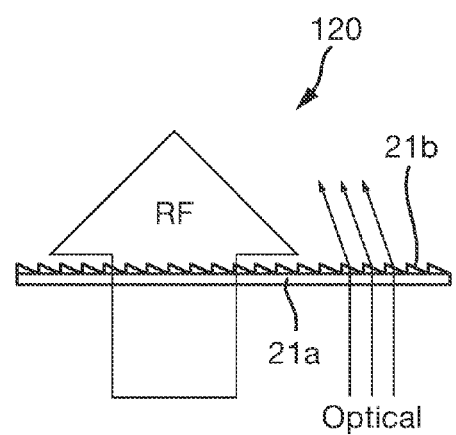
Figure 4:
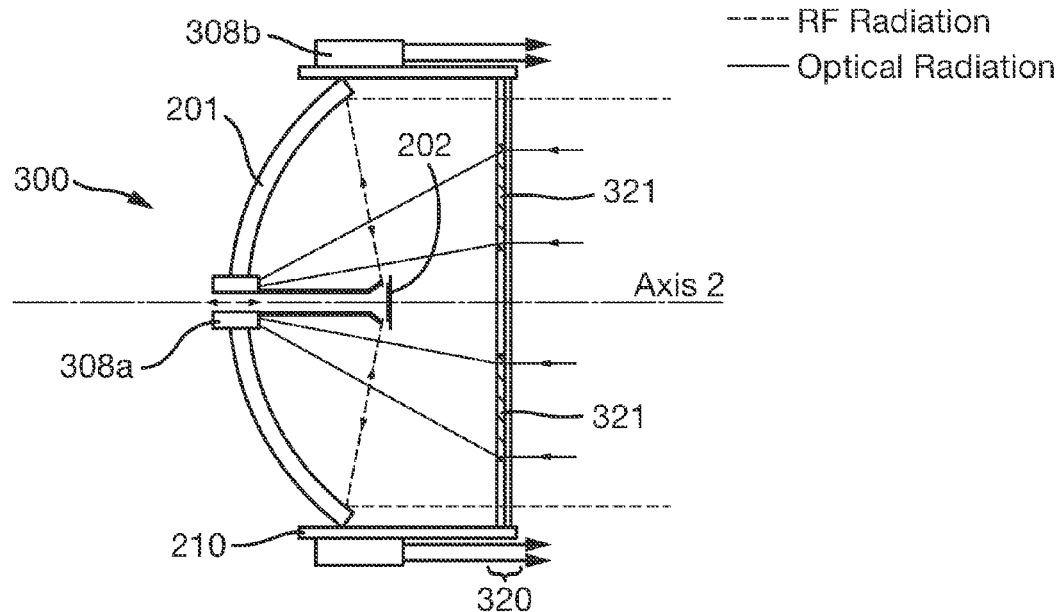
Figure 5:
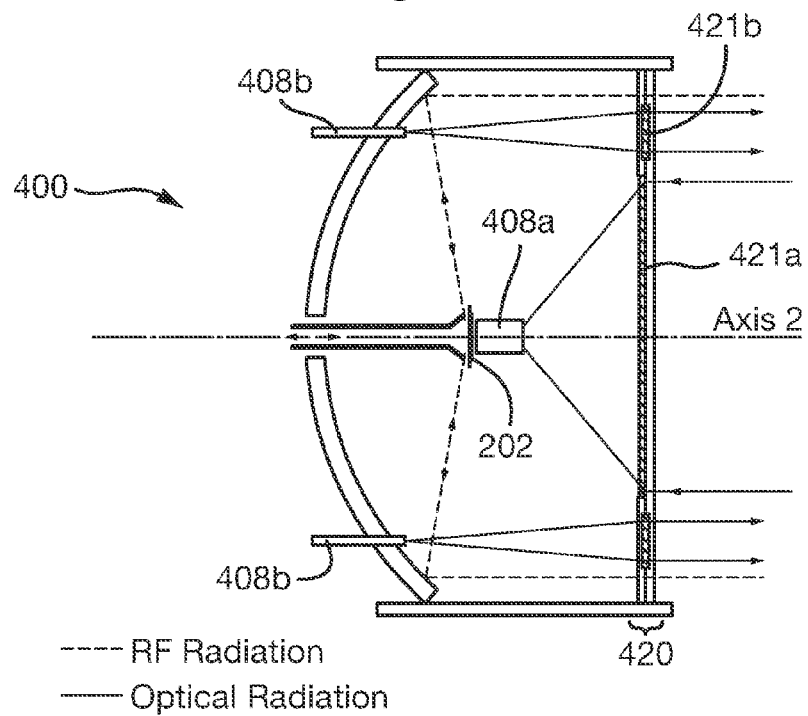
Figure 6A:
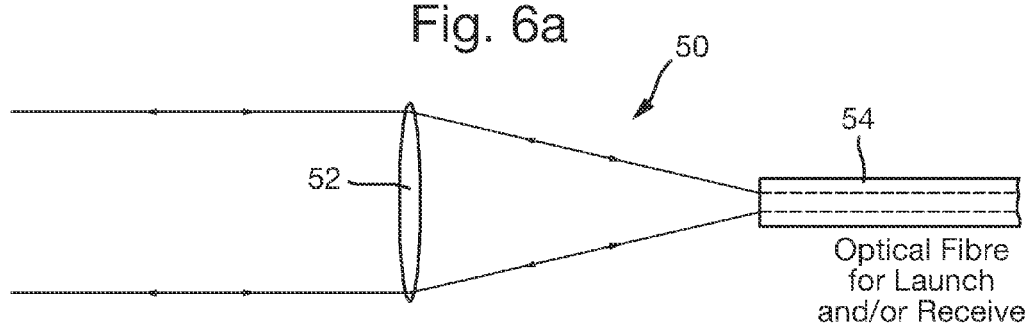
Figure 6B:
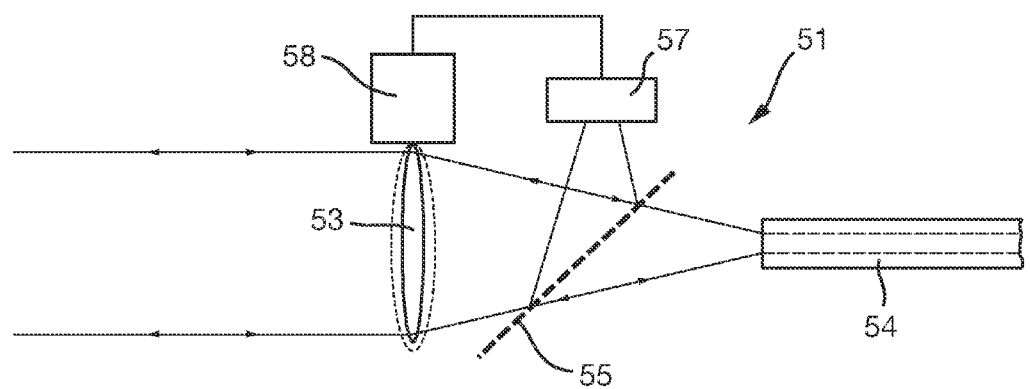
Figure 6C:
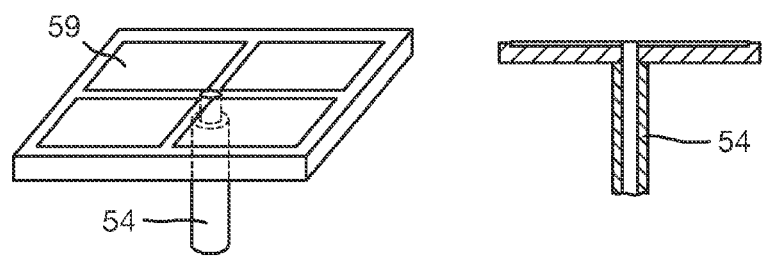

So that the invention may be well understood, embodiments thereof shall now be described and with respect to the following Figures of which:

FIG. 1 shows a cross-sectional view through a first embodiment of a multi-band antenna, FIGS. 2a and 2b represent the operation of a first beam forming device for use in a multi-band antenna, whilst FIG. 2c represents the operation of another beam forming device for a multi-band antenna, FIG. 3 shows a cross-sectional view through a second embodiment of a multi-band antenna, FIG. 4 shows a cross-sectional view through a third embodiment of a multi-band antenna, FIG. 5 shows a cross-sectional view through a fourth embodiment of a multi-band antenna, FIG. 6a shows an arrangement for an optical unit for coupling visible wavelength radiation into an optical fibre and equivalently collimating light emitted from such a fibre, FIG. 6b shows an arrangement for an optical unit as in FIG. 6a further arranged such that the beam may be manipulated and sampled, and FIG. 6c shows an arrangement for an optical unit as in FIG. 6a and provided with an alternative sampling arrangement to that shown in FIG. 6b.

Referring to particularly FIG. 1 but also FIGS. 2a-d, a first embodiment of a multiband directional antenna, shown generally at 100, comprises an optical unit 108 and an RF unit 110 supported within a housing 10, and arranged to receive optical signals (shown in the Figures with solid arrow lines) and RF signals (shown in the Figures with dashed arrow lines). In particular, the antenna is arranged such that certain optical and RF signals may propagate along a common axis A1 (shown in the Figures with a dot-dash line), or parallel thereto, through the mouth of the housing and onwards into the housing to illuminate the units. Thus the embodiment can be thought of as having a common aperture. A beam forming device 120 is provided at the mouth of the housing which comprises a substantially planar RF lens 122 adjacent to a substantially planar optical lens 121. The lenses 121 and 122 are arranged such that incident optical or RF signals pass through the lenses in series. The lenses 121, 122 define the axis A1 which intersects the lenses 121 and 122 and is perpendicular to the planes of the lenses 121 and 122.

The optical lens 121 is provided with a lensing structure in the form of an array of surface relief elements (e.g. micro-prisms 22a, 22b) each of which refracts a portion of an incident beam so that overall, the elements perform a predetermined manipulation (e.g. focussing radiation to a focal point at a particular location) on the incident radiation.

The optical lens 121 may be considered a Fresnel lens, or a device approximating thereto, for focussing incoming collimated light onto the optical unit 108 or for collimating light signals emitted by the optical unit 108.

The optical lens 121 comprises an array of densely-packed miniature surface relief elements, each surface relief element having a maximum dimension less than $1/10^{th}$ of the wavelength of the RF signal. As such the lens 121 is substantially transparent to RF signals and allows such to pass through without manipulation.

The RF lens 122 is provided with a lensing structure having an array of surface relief elements for manipulating an incident RF signal beam by refraction and/or diffraction. Further, the RF lens 122 is substantially transparent to optical signals and allows such to pass through without manipulation.

The optical unit 108 is for receiving and processing (or relaying onwards for processing) optical signals incident upon its sensors. The optical unit 108 is also for transmitting optical signals.

In particular, the optical unit 108 operates with near infra-red (IR) radiation (~750-1700 nm). However, in other embodiments, the optical unit 108 may be configured for use with a broader range of optical signals, 200-12,000 nm for example is contemplated for embodiments where UV signals may (in addition to visible and IR) be of interest.

The RF unit 110 is for receiving and processing (or relaying onwards for processing) RF signals incident upon its sensors. The RF unit 110 is also for transmitting RF signals. The RF unit 110 has an operational centre-frequency in the frequency range between 50 GHz and 70 GHz.

The optical unit 108 and the RF unit 110 are arranged within the housing 10 so as to be offset from one another with their sensors substantially in the same plane, which plane is generally perpendicular to the axis A1 and thus generally parallel with the lenses 121 and 122. An arrangement such as this is chosen to prevent either unit obstructing the field of view of the other.

The beam forming device 120 is in some embodiments constructed according to the principles shown in FIGS. 2a and 2b. In particular, by applying the surface relief elements of the optical lens 121 to the surface relief elements of the RF lens 122 (or vice versa), it is possible to superimpose the effect of the optical surface relief elements 21a, 21b on the effect of the RF surface relief elements 22a, 22b.

Thus, as in FIG. 2a, where it is desired to bend the incident RF radiation, but not significantly bend the incident optical radiation, a suitably angled wedge-profiled local RF element 22a for refracting the RF radiation is provided. The wedge-shaped local RF element 22a is further provided with a plurality of suitably angled mini-wedge shaped local optical elements 22b which offer a flat boundary normal to the optical radiation whilst being sufficiently small (having a pitch less than $1/10^{th}$ the wavelength of the RF signals) such that they do not tend to significantly affect the RF radiation.

In the inverse scenario, as in FIG. 2b, where it is desirable to provide an element that bends the light but allows the RF signal to pass without diversion, the local RF element 21a is no longer wedge-shaped but instead has the form of a flat sheet of material where the upper surface is parallel to the lower surface. Superimposed on the local RF element 21a is a plurality of local optical elements 21b which are effectively transparent to RF (on account of their short proportions relative to the RF wavelength) and allow RF to pass substantially unaffected. However the local optical elements 21b are shaped for refracting the optical radiation to suit a predetermined focal profile.

Between these extremes of selective steering shown in FIGS. 2a and 2b, it should be apparent how to provide an integrated lens which bends incident RF in some manner and also bends incident light in a manner independent of the RF bending. Thus the exact shaping of the local RF elements and the local optical elements is determined based on bending requirements such that the elements can be manufactured and applied accordingly.

Referring to FIG. 2c, as an alternative to the superimposed lensing structure 120 shown in FIGS. 2a and 2b, a beam steering/forming device 1120 may be provided in the aperture of the antenna 100.

The beam forming/steering device 1120 is comprised by a first planar lens 1122 for focussing the RF signal, operating in conjunction with, but spaced apart from, a second planar lens 1121 for focussing the optical signal.

The lensing structure of planar RF lens 1122 is in the form of a multi-order stepped-element array which approximates in four-levels to a quadratic blaze profile (formed for example by a four step photolithographic process). The stepped elements form a predominantly diffractive lens (though some refraction may occur) and thus function to manipulate the passing RF signal but, having no inclined angle, do not tend to substantially refract or otherwise distort the optical radiation passing therethrough.

The lensing structure of planar optical lens 1121 is in the form of a Fresnel lens formed by a micro-prism array where the dimensions of each prism are too small to affect the RF radiation passing therethrough.

In particular, a Fresnel lens with over two grooves per millimeter, such as manufactured by Edmund Optics (www.edmundoptics.com, regional office Edmund Optics Ltd, Unit 1, Opus Avenue, Nether Poppleton, York, United Kingdom), may be used to render the optical lens 1121 effectively transparent to RF signals because the scale of the surface structures is too small (the pitch is less than a $1/10^{th}$ of the wavelength of a 60 GHz RF signal) to affect the RF signal.

The beam forming planar lenses including the surface relief elements 22a, 22b, 21b, 21a, 1121, 1122 should be formed from a material that is transparent to both optical radiation and the RF signal (e.g. millimetric wavelength RF signals). As such, the elements chosen for use in the present invention are formed from at least one of a group comprising: quartz, perspex, polycarbonate and sapphire. To enable the lens structure to be conveniently modelled, and thus to provide a precisely arranged device, the material chosen from this group should have a well-defined dielectric constant.

In operation the antenna 100 may receive optical and/or RF signals.

When receiving optical radiation, optical radiation impinging on the antenna 100 along axis A1 or impinging parallel thereto and within the mouth of the housing 10, will be focussed, by the elements defining the optical lens 121 or 1121, onto the sensors of the optical unit 108.

When receiving RF signals, RF radiation impinging on the antenna 100 along axis A1 or impinging parallel thereto and within the mouth of the housing 10, will be focussed, by the elements defining the RF lens 122 or 1122, onto the sensors of the optical unit 110.

The antenna 100 may also transmit RF and/or optical signals.

If transmitting optical signals, the optical unit 108 generates and emits an optical signal which propagates divergently towards the optical lens 121 or 1121 of the beam forming device 120 or 1120. The optical signal is thus collimated by the device 120 or 1120 and propagates from the antenna unit 100 as a beam parallel with and centred about axis A1.

If operating to transmit RF signals, RF signals are generated at the RF unit 110 which propagate divergently onto the RF lensing structure of the device 120 or 1120, whereupon the RF signals are collimated and form a beam parallel with and centred about axis A1.

Thus the antenna 100 may send or receive RF signals and, simultaneously and independently of the RF signals, send or receive Optical signals.

A second embodiment of the invention is shown, with reference to FIG. 3, and indicated generally at 200, which may be particularly suited for retrofitting to existing RF receivers and transmitters.

The antenna 200 comprises an RF unit 110 for receiving and transmitting RF signals. The RF unit 110 extends through an aperture at the centre of a parabolic reflector 201 and faces a plate reflector 202, which is in this embodiment in the form of a splash plate reflector (in alternative embodiments the plate reflector 202 may be a ring focus subreflector). The RF unit 110 defines an antenna axis A2 about which the parabolic reflector 201 is symmetrical and to which the plate reflector 202 is perpendicular.

Mounted behind the plate reflector 202 (that is to say on the opposite side of the plate reflector 202 to the RF unit 110) is an optical unit 108 that faces along the axis A2 in the same outward direction as the RF unit 110.

The optical unit 108 is for transmitting and receiving optical signals and is located behind a planar optical lens 221 (i.e. the optical lens is further from the plate reflector 202 than the optical unit 108). The optical lens 221 may have a form equivalent to the prism array Fresnel lens 1121 discussed above with reference to FIG. 2c, but with the focal properties predetermined according to the local housing, housing 210.

The optical lens 221 is substantially perpendicular to the axis A2 and is arranged to both focus incoming optical radiation onto the sensors of the optical unit 108 and to collimate outgoing optical radiation. The planar optical lens 221 is substantially transmissive/transparent to RF signals.

A generally tubular housing 210 surrounds and is attached to the periphery of the parabolic reflector 202 and the periphery of the optical lens 221. Thus support may be provided to the components of the antenna 200.

If operating to transmit RF signals, the RF unit 110 generates an RF signal which propagates divergently towards the planar splash plate reflector 202. Upon illuminating the plate reflector 202, at least a portion of the RF signal is reflected backwards towards the parabolic reflector 201. Upon impinging on the parabolic reflector 201, the RF signal is reflected and collimated to propagate as a beam parallel with and centred about axis A2. The planar optical lens 221 is substantially transmissive of RF signals and so the RF beam may pass through this lens with little or no loss or manipulation.

If operating to receive RF signals, beams of RF propagating through the optical lens 221 and onto the parabolic reflector 201 along axis A2 or parallel thereto and within the mouth of the housing, will be reflected onto the RF unit 210 via the planar reflector 202.

If operating to transmit optical signals, the optical unit 108 generates an optical signal which divergently propagates towards the optical lens 221. Upon incidence on the optical lens 221, the elements of the lens 221 refract the signal, in a predetermined manner given the position of the optical unit 108 relative to the lens 221, such that optical signals transmitted onwards from the lens 221 are collimated as a beam parallel with and centred about axis A2.

A third embodiment of an antenna according to the invention is indicated generally at 300 in FIG. 4.

The antenna 300 is similar to the second embodiment antenna 200 for example insofar as its RF band reception and transmission apparatus and operation is concerned: there is an RF unit 110 disposed at the centre of a parabolic reflector 201, the RF unit 110 being directed towards a plate reflector 202. Further, the antenna 300 is provided with a planar lens 321 that is generally transparent to RF radiation and is secured in front of the parabolic reflector by a generally tubular housing 210, which housing also surrounds and supports the parabolic reflector 201.

However, in antenna 300 the optical unit is arranged differently. The optical unit comprises optical transmit sub-units 308b and separate optical receive sub-units 308a.

The optical transmit sub-units 308b are arranged around the outside of the tubular housing 210 and emit collimated light.

The optical receive sub-units 308a are arranged towards the central axis of the parabolic reflector 201, and generally surrounding the RF unit 110.

The optical lens 321 may have a general form equivalent to the prism array Fresnel lens 1121 discussed above with reference to FIG. 2c, but with the focal properties predetermined according to the embodiment dimensions. Further, to minimise the area of the lens, the lens may be an annular lens, or a plurality of lenses mounted in a ring, because the central portion, which is obscured from the sensor 308a by the splash plate 202 and the RF unit need not manipulate incident radiation.

In operation, when the antenna 300 is receiving optical signals, the lens 321 is able to focus collimated light, incident along the device axis A2 or parallel thereto, and from the far field, onto the sensors of the optical receive units 308a.

When transmitting optical signals, the units 308b each generate and emit a collimated optical signal which propagates along an axis parallel to Axis A2.

A fourth embodiment of an antenna according to the invention is indicated generally at 400 in FIG. 5.

The antenna 400 is similar to the second and third embodiment antennas (200 and 300 respectively) for example insofar as its RF band reception and transmission apparatus and operation is concerned: there is an RF unit 110 disposed at the centre of a parabolic reflector 201, the RF unit 110 being directed towards a splash plate reflector 202. Further, the antenna 400 is provided with a planar lens 420 that is generally transparent to RF radiation and is secured in front of the parabolic reflector 201 by a generally tubular housing 210, which housing 210 also surrounds and supports the parabolic reflector 201.

The optical transmit and receive apparatus are arranged in the antenna 400 such that there is provided a receive sub-unit 408a and transmit sub-units 408b. Each transmit unit 308b is separate from the receive unit 308a.

More specifically, the optical receive sub-unit 408a is mounted in front of the splash plate 202, on the axis A2, with sensors pointing towards the planar lens 420, and thereby being arranged to receive light along the axis A2 from a central optical lens 421a of the planar lens 420. The central optical lens 421a of the planar lens 420 is configured to focus light, incoming over axis A2 or parallel thereto, onto the sensors of the optical receive sub-unit 408a.

The central optical lens 421a has a general form equivalent to the micro-prism array Fresnel lens 1121 discussed above with reference to FIG. 2c, but with the focal properties predetermined according to the embodiment dimensions.

Further, the optical transmit sub-units 408b, which may be optical fibres extending through the reflector 201, are arranged towards the periphery of the parabolic reflector 201, to emit divergent light towards the planar lens 420.

The planar lens 420 is provided with transmit optical lenses 421b. Such transmit lenses 421b are located at the planar lens 420 and are peripheral to the central receive lens 421a. The transmit lens 421b is formed by a plurality of discrete lenses which are arranged in a ring, each discrete lens being paired-up with and focussed on a particular transmit optical unit 408b. As such, light emitted by a given transmitter 408b will be collimated at the corresponding lens 421b and form a beam propagating along an axis parallel to axis A2.

Each of the transmit lenses 421a has a general form equivalent to the prism array Fresnel lens 1121 discussed above with reference to FIG. 2c, but with the focal properties predetermined according to the embodiment dimensions.

Referring to FIG. 6a, an optical coupling device 50 is shown as may be included in an optical unit, such as 108, for transmitting or receiving collimated light. In alternative embodiments, the optical unit could be provided with a suitable lens to adapt the unit for receiving non-collimated (e.g. convergent) light.

The coupling device comprises a lens 52 arranged in the beam and configured to focus the beam to an optical fibre 54 (though other optical conduits may be used in alternative embodiments). The optical fibre 54 may transfer optical signals to and from an optical processing module (not shown).

A more complex optical coupling device, referred to generally at 51 is shown in FIG. 6b. In addition to the device 50 of FIG. 6a, device 51 comprises an active lens 53 and also is provided with a beam splitter 55 positioned between the lens 53 and the optical fibre 54.

The beam splitter 55 is arranged to reflect a portion (typically 10%) of the incoming light signal to an optical sensor 57. The optical sensor 57 is connected to a lens control unit 58 such that the active lens 53 may take on an optimal shape for focussing/collimating the light signal, having considered the sample taken from the beam splitter 55.

The active lens 53 may be a fluidic lens and/or may be provided on a tip-tilt mount and thereby be able to perform beam steering operations.

Referring to FIG. 6c, as an alternative to the combination of the beam splitter 55 and the sensor 57, the optical coupling device 51 may be provided with an array of sensors 59 surrounding the optical fibre 54. The array of sensors 59 are mounted on a planar substrate which is arranged perpendicularly to the beam axis. The array of sensors 59 may be interfaced with the control unit 58 of the active lens 53 such that the condition of the light signal at the fibre 54 may be fed back to the lens 53, and the lens 53 adapted accordingly.

The above embodiments could be suitable for operation in various RF frequency ranges provided that the dimensions of the reflectors and/or surface elements are appropriately designed to match any chosen operational frequency. Particular frequency ranges contemplated would be in the 50 GHz to 70 GHz range and more particularly in the region of 60 GHz. However, other embodiments may operate in the super high frequency (3-30 GHz) or extremely high frequency (30-3000 GHz) ranges. Dimensions of the antenna are somewhat dictated by the operational frequency and desired antenna gain (for example the diameter of the primary parabolic reflector 201 with a nominal 30 dB gain may be approximately 0.3 m for a 10 GHz carrier frequency, but may be approximately 2 m for a 1.5 GHz band carrier frequency).

Various lensing structures for planar lenses are contemplated for use with the present invention. The skilled man would, upon reading this application, readily understand the alternative lensing structures which could be applied to work the invention. For example, devices understood as being kinoforms, volume holograms, zonal masks etc. could be used.

The RF unit may in general be an RF Horn or a plain waveguide end emitter provided with a beam shaping dielectric lens.

The above embodiments have shown antennas for receiving a beam of radiation and/or for transmitting a collimated beam of radiation. In each embodiment the beam has been collimated such that it does not diverge. However in variant embodiments of the present invention, a linear-scan directional antenna may be provided having a beam that is collimated in a first aspect but diverges in a second aspect. For example a beam could be collimated horizontally but diverge vertically so as to permit scanning in the azimuth.

Various embodiment of the invention have been described above with certain features common between embodiments, and certain other feature being uniquely presented in the context of a particular embodiment. However, this is not necessarily intended to limit such a feature to use with a particular embodiment. In general, features from one embodiment may be imported into another embodiment or exchanged for another, without departing from the scope of the invention.

The invention claimed is:

1. A directional multi-band antenna, the antenna comprising:
    an optical unit comprising an optical sensor;
    an RF unit comprising an RF sensor;
    a substantially planar optical lens, the optical lens comprising surface relief elements for beam forming, the optical lens being arranged to focus optical signal beams, incident along a first optical axis, directly onto the optical sensor, the optical lens being substantially transparent to RF signals; and
    an RF beam forming device arranged to receive RF signals incident along the first optical axis and focus such RF signals onto the RF sensor.

2. The antenna according to claim 1 wherein the optical unit comprises an optical transmitter unit wherein the substantially planar optical lens is arranged to collimate optical signals emitted by the optical transmitter unit to form a beam parallel to the first optical axis.

3. The antenna according to claim 1 wherein the optical unit is positioned on the first optical axis to transmit and receive optical signals along the first optical axis.

4. The antenna according to claim 1 wherein the optical unit is offset from the optical axis, and wherein the RF unit is offset from the first optical axis.

5. The antenna according to claim 1 wherein the RF unit and the optical unit are each arranged so as to be provided with an unobstructed focal region.

6. The antenna according to claim 1 wherein the RF beam forming device includes a substantially planar RF lens comprising surface relief elements for beam forming.

7. The antenna according to claim 6 wherein the RF beam forming device and the substantially planar optical lens are integrated such that the surface relief elements of the optical lens are mounted on the surface relief elements of the RF lens.

8. The antenna according to claim 6 wherein the substantially planar RF lens provides an RF focal point for incoming RF signals, which RF focal point is separated from the optical focal point of the incoming optical signals, and wherein the optical unit is located at the optical focal point and the RF unit is located at the RF focal point, such that neither unit obstructs the focal field associated with the other unit.

9. The antenna according to claim 1, further comprising an RF reflector.

10. The antenna according to claim 1 wherein the optical unit comprises at least one first sub-unit for transmitting optical signals and at least one second sub unit for receiving optical signals, the first and second sub units being separated.

11. The antenna according to claim 1 wherein the RF unit is operable at a centre-frequency in the range between 50 GHz and 70 GHz.

12. The antenna according to claim 1 wherein the RF unit comprises a transmitter, arranged in relation to the RF beam forming device such that the antenna is able to send substantially collimated RF signals.

13. The antenna according to claim 1 wherein the antenna is directional insofar as it provides a beam collimated in one dimension only, so as to be able to perform a linear scan operation.

14. A directional multi-band antenna, the antenna comprising:
    an optical unit comprising an optical sensor and an optical transmitter unit;
    an RF unit comprising an RF sensor and an RF transmitter;
    a substantially planar optical lens, the optical lens comprising surface relief elements for beam forming, the optical lens being arranged to collimate optical signals emitted by the optical transmitter unit to form a beam parallel to the first optical axis and to focus the optical signal beam, incident along a first optical axis, directly onto the optical sensor, the optical lens being substantially transparent to RF signals; and
    an RF beam forming device arranged to receive RF signals incident along the first optical axis and focus such RF signals onto the RF sensor, and to send substantially collimated RF signals from the RF transmitter.

15. The antenna according to claim 14 wherein the optical unit is one of positioned on the first optical axis to transmit and receive optical signals along the first optical axis, or offset from the optical axis in which case the RF unit is offset from the first optical axis.

16. The antenna according to claim 15 wherein the RF unit and the optical unit are each arranged so as to be provided with an unobstructed focal region.

17. The antenna according to claim 14 wherein the RF beam forming device includes a substantially planar RF lens comprising surface relief elements for beam forming, and the RF beam forming device and the substantially planar optical lens are integrated such that the surface relief elements of the optical lens are mounted on the surface relief elements of the RF lens.

18. The antenna according to claim 17 wherein the substantially planar RF lens provides an RF focal point for incoming RF signals, which RF focal point is separated from the optical focal point of the incoming optical signals, and wherein the optical unit is located at the optical focal point and the RF unit is located at the RF focal point, such that neither unit obstructs the focal field associated with the other unit.

19. The antenna according to claim 14, further comprising an RF reflector.

20. A directional multi-band antenna, the antenna comprising:
    an optical unit comprising an optical sensor and an optical transmitter, the optical sensor and optical transmitter being separated;
    an RF unit comprising an RF sensor and an RF transmitter;
    a substantially planar optical lens, the optical lens comprising surface relief elements for beam forming, the optical lens being arranged to collimate optical signals emitted by the optical transmitter unit to form a beam parallel to the first optical axis and to focus the optical signal beam, incident along a first optical axis, directly onto the optical sensor, the optical lens being substantially transparent to RF signals; and
    an RF beam forming device arranged to receive RF signals incident along the first optical axis and focus such RF signals onto the RF sensor, and to send substantially collimated RF signals from the RF transmitter, wherein the antenna is directional insofar as it provides a beam collimated in one dimension only, so as to be able to perform a linear scan operation.

* * * * *